United States Patent [19]
Shimamune et al.

[11] Patent Number: 5,255,302
[45] Date of Patent: Oct. 19, 1993

[54] FOIL-THICKNESS MEASURING DEVICE

[75] Inventors: Takayuki Shimamune, Tokyo; Tamotsu Hayashi, Kanagawa, both of Japan

[73] Assignee: Permelec Electrode, Ltd., Kanagawa, Japan

[21] Appl. No.: 845,262

[22] Filed: Mar. 3, 1992

[30] Foreign Application Priority Data

| Mar. 5, 1991 | [JP] | Japan | 3-38404 |
| May 16, 1991 | [JP] | Japan | 3-111899 |

[51] Int. Cl.$^5$ .................... G01B 15/02; C25D 1/04
[52] U.S. Cl. ........................... 378/55; 378/51; 378/54; 378/207
[58] Field of Search .............. 378/55, 56, 54, 48, 378/50, 58, 207, 51; 250/359.1, 358.1

[56] References Cited

U.S. PATENT DOCUMENTS

| 4,331,241 | 5/1982 | Smirin et al. | 378/54 |
| 4,928,257 | 5/1990 | Yerkes et al. | 378/54 |
| 4,954,719 | 9/1990 | Harris | 378/55 |
| 5,003,569 | 3/1991 | Okada et al. | 378/54 |
| 5,014,288 | 5/1991 | Chase et al. | 378/53 |
| 5,029,337 | 7/1991 | MacKenzie et al. | 378/54 |
| 5,099,504 | 3/1992 | Pettit | 378/54 |
| 5,103,471 | 4/1992 | Spongr et al. | 378/55 |
| 5,113,421 | 5/1992 | Gignoux et al. | 378/54 |

*Primary Examiner*—David P. Porta
*Assistant Examiner*—Kim-Kwok Chu
*Attorney, Agent, or Firm*—Sughrue, Mion, Zinn, Macpeak & Seas

[57] ABSTRACT

A device for continuously measuring the thickness of a foil includes a radiation source opposite a radiation detector, and a movement member which moves the radiation source and detector synchronously in a width-direction of the foil. A signal generator generates a signal indicating a position of a portion of the foil whose thickness is being measured, and a counter having a plurality of integrating channels integrates detection signals output from the detector to generate an integrated count number for each channel. A signal switching member switches each of the plurality of integrating channels of the counter according to signals generated by the signal generator, and a calculator calculates a foil thickness from the integrated counted number for each channel of the counter. This structure allows continuous and precise measurement of the foil's thickness.

20 Claims, 3 Drawing Sheets

FOIL-THICKNESS MEASURING DEVICE

FIELD OF THE INVENTION

The present invention relates to a continuous, foil-thickness measurement device which can be incorporated in a continuous foil production device and which precisely determines foil thickness.

BACKGROUND OF THE INVENTION

Foils are produced by a variety of methods according to the materials or projected uses of the foils. A representative foil production method is a rolling method, in which metal is passed between pressure rollers while being pressed by the rollers to thereby roll the metal into a foil.

In this method, the rolling speed increases as the metal thickness decreases during the rolling operation. This production method, therefore, is suitable for mass production. However, the rolling method is disadvantageous in that production of thinner foils requires far more complicated techniques and poses problems concerning application of tension, roller nip control, etc. Further, rolled foils do not always have a uniform thickness in the width direction because of limitations on the shapes of the rollers employed in the operation.

On the other hand, electrolytic copper foils, particularly those used in copper-clad laminates to be used as printed-circuits, have been recently investigated. One exemplary apparatus for electrolytic copper foil production is illustrated in FIG. 5. In this method, an electric current is applied between a large-sized cathodic roller 53 as the cathode and an insoluble anode 54 as the counter electrode, with the lower part of the cathodic roller 53 being immersed in an electrolyte solution 52 in an electrolytic tank 51, thereby to continuously plate the roller surface with copper, and simultaneously, the deposited copper metal 55 is continuously peeled from the roller surface to obtain a copper foil 56. This electrolytic method is characterized in that the average thickness of the copper foil 56 being produced can be easily controlled by changing the intensity of the electric current applied, and this method can easily produce thin foils unlike the rolling method described above.

However, the above-described electrolytic foil production is disadvantageous since the distribution of applied current becomes nonuniform when the electrodes used in the electrolysis process are consumed or undergo a change in their electrochemical properties, and this may result in the copper foil being produced having different thicknesses in its width direction. Of course, this unevenness in thickness can be easily corrected by masking the electrode surfaces or by other means, unlike the thickness nonuniformity encountered in the mechanical foil production by means of pressure rollers.

In foil production, various techniques have conventionally been used for measuring foil thickness and In some instances, foil thickness is controlled automatically.

For example, in the mechanical production process for a rolled foil, a representative method is to continuously gauge the foil thickness with a micrometer. That is, the thickness is measured with a contact-type micrometer during rolling. According to this technique, the thickness of a foil is continuously measured only in its portions near the side edges because using the contact-type thickness meter may scar the foil, and the results obtained by the gauging are utilized for controlling the roller nips and tension. Although thickness measurement over the foil width cannot be made in such a method, this, as a practical matter, is not a problem because in foil production by mechanical rolling, the thickness distribution in the width direction is almost constant throughout the production.

Thickness meters utilizing X-rays or $\gamma$-rays are also being used in which an X-ray or $\gamma$-ray source is placed on a first side of a foil and a detector is placed on a second side. However, since such a thickness meter, like the contact-type micrometer, has been designed for use with rolled foils, it is being utilized to determine the thickness distribution in the rolling direction of the foil, not in the width direction of the foil. That is, the thickness meter employing X-rays or $\gamma$-rays has been used to sense a thickness change in the rolling direction to control the rolling device. Although rolled foils, in particular, tend to have larger thicknesses around both side edges thereof than in their central portions because of the pressure rollers which generally have larger diameters at their central portions, such rolled foils each have an almost constant thickness distribution in the width direction. Hence, the thickness meter utilizing X-rays or $\gamma$-rays has been used only to gauge the thickness of the foil along the conveyance direction of the roll to control the average thickness based on the data obtained.

As described above, the foil thickness-measuring techniques have been used in the production of rolled foils to control the average thicknesses of the foils. However, in producing electrolytic foils, although average thickness control can be easily attained because average thickness is proportional to electric current employed for electrolysis, the thickness of a foil being produced changes depending on the electrochemical properties of the surfaces of the electrodes, i.e., the counter electrode for electrolysis and the cathodic roller on which a metal is electro-deposited. Thus, if the electrode properties become uneven, the resulting foil has different thicknesses in the width direction. However, none of the conventional devices have been able to precisely determine the thickness distribution of a foil in the width direction.

On the other hand, there is a device for continuously measuring and controlling the thickness of a metal layer formed by plating. That is, the device automatically measures the thickness of a deposited zinc or tin layer formed by plating on a steel plate and controls the amount of metal being deposited. For plated articles with small deposited metal thicknesses, an X-ray fluorescence spectroscopic technique is usually employed which enables precise gauging. This technique has an advantage that the unevenness of the thickness in the width direction can also be determined by making a measurement with the gauging head traversing the width direction of the plated article, but it necessitates a large-capacity X-ray source and an expensive X-ray spectrometer. Further, this technique is defective in that sufficient determination of thickness distribution cannot be conducted because the device has been designed primarily for the measurement of the composition of the deposit and the geometrical relationship between the device and the work (deposit) must be strictly controlled which is difficult for the foil producing. Further, the deposit thicknesses which can be measured by this technique are limited to relatively small values, i.e., 10

μm or less, although such a range varies depending on the types of plated articles produced.

Other devices for thickness measurement include a β-scope which employs a radioisotope and utilizes β-ray backscatter. Although this device can be used to measure the thickness of relatively thick materials, the device does not have the measurement precision required for the thickness measurement of electrolytic copper foils for use in, for example, printed-circuits.

SUMMARY OF THE INVENTION

In view of the foregoing problems of the conventional devices and methods, an object of the present invention is to provide a thickness-measurement device that can continuously and nondestructively measure the thickness of an electrolytic foil, such as an electrolytic copper foil in which thickness distribution in the width direction is critical and must be controlled with high precision.

Other objects and effects of the present invention will be apparent from the following description.

The present invention provides a continuous, foil thickness measurement device which can be incorporated into foil production equipment, and which comprises an X-ray or γ-ray source, a radiation detector placed on the opposite side of a foil from the radiation source, a movement mechanism for moving the radiation source and the detector synchronously in the foil width direction, a signal generator which generates a signal indicating the distance between the position of a foil's portion whose thickness is being gauged and a side edge of the foil, or which generates a signal indicating the time period that has passed since movement of the radiation source and the detector began from a side edge of the foil, a counter which has integrating channels and integrates detection signals sent from the detector, a signal-switching mechanism for switching the integrating channels of the counter according to signals generated by the signal generator, a calculator which calculates the foil thickness from an integrated count number for each channel, and an output unit which outputs a foil thickness distribution.

DETAILED DESCRIPTION OF THE PREFERRED EMBODIMENTS

Figure 1:
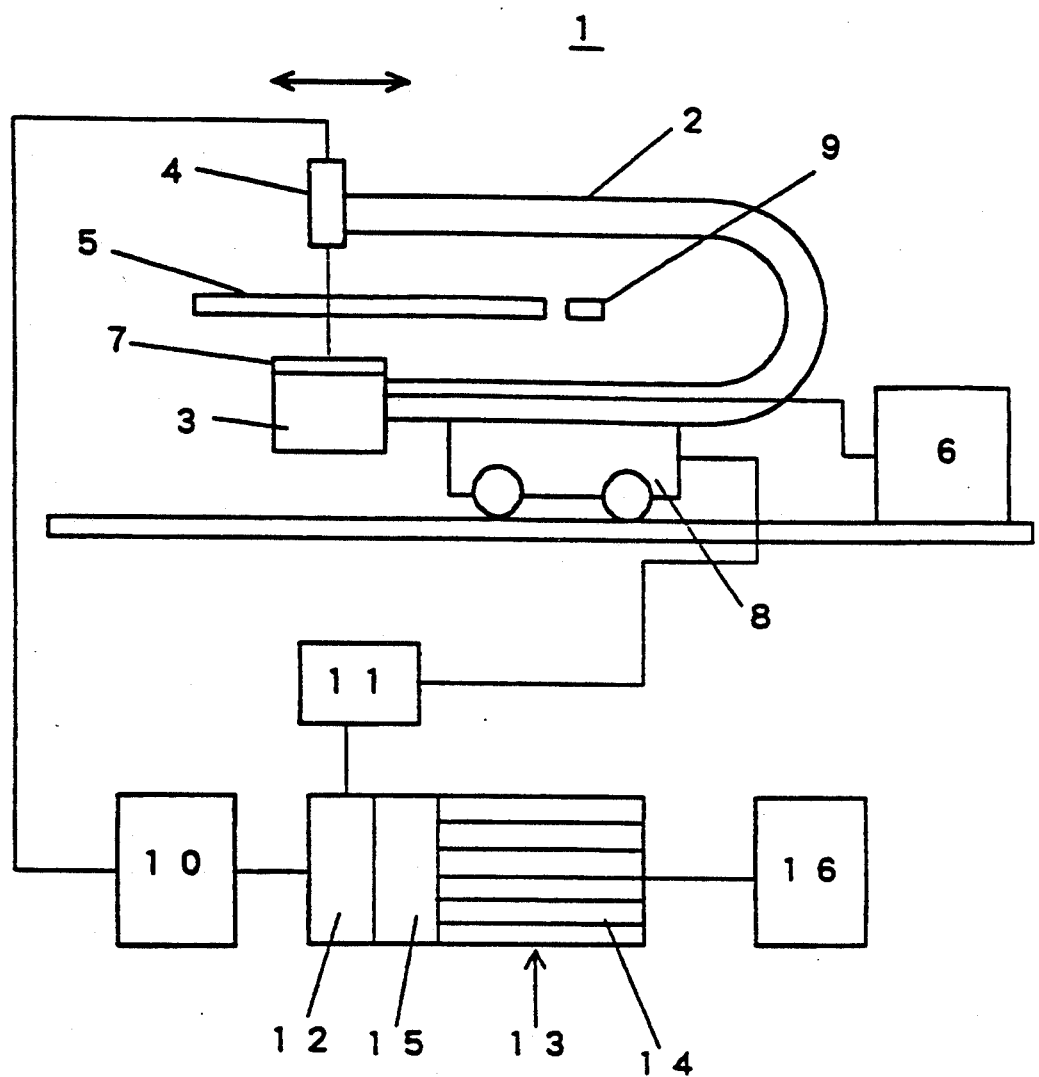
FIG. 1 is a view illustrating one embodiment of the continuous, foil thickness measurement device according to the present invention.

The thickness-measuring technique utilizing X-rays or γ-rays comprises irradiating a substance to be inspected with X-rays or γ-rays, measuring the intensity of transmitted radiation after part of the incident radiation has been absorbed by the substance, and calculating the thickness of the substance from the absorbed radiation amount. By changing the wavelength of X-rays or changing the type of γ-ray source, this technique can be applied to measuring the thicknesses of a variety of substances from thin films having thicknesses of several micrometers to relatively thick substances having thicknesses of several tens of centimeters, and from substances showing relatively low X-ray absorption, such as resins and papers, to heavy metals showing high X-ray absorption. Given a substance whose properties and rough thickness are known, precise and rapid thickness measurement can be made by using appropriate X-rays or γ-rays so that a large proportion of incident radiation is absorbed by the substance. Further, the X-ray or γ-ray method is advantageous in that the size of the radiation source used therewith can be about one tenth to one hundredth of that of the radiation source for the fluorescent X-ray method since in the X-ray fluorescence method, the intensity of fluorescent X-rays generated by irradiation with X-rays or γ-rays is generally less than half of that of the incident rays. Further, the fluorescent X-rays, when passing through a dispersive type spectrometer, are attenuated to have an intensity one tenth or less than that of the incident rays, although such a decrease in intensity depends on the wavelength of the incident radiation.

The transmission method is advantageous in that the measuring mechanism is simple and the device employed therein is compact. However, this method has a drawback in that accurate thickness measurement is difficult since generally a change in the thickness of a substance being inspected results in an insufficient change in the intensity of X-rays absorbed by the substance.

Hence, the required wavelength of X-rays or γ-rays with which a foil is to be irradiated for a thickness measurement is determined by the type of foil and, hence, a proper radiation source should be selected. For example, $^{241}$Am and $^{238}$Pu are useful for inspecting substances having large thicknesses because $^{241}$Am emits γ-rays with an energy of 60 keV and $^{238}$Pu emits γ-rays by α-decay with energies of 13 keV to 17 keV. Such radiation sources should be selectively used according to the types of foils.

In using an X-ray source as a radiation source, since the X-rays from the source contain continuous-wavelength X-rays and characteristic X-rays attributable to the anode material used, the emitted X-rays can be filtered to remove unnecessary rays to thereby the obtain the necessary X-rays. Longer-wavelength X-rays can be removed by using, as the filter, a metal having a smaller atomic number than the substance to be inspected. For example, to inspect a copper foil, a foil of titanium or the like may be used as the filter. Shorter-wavelength X-rays may be obtained by utilizing the absorption characteristics of X-rays, i.e., by using as a filter a material having an absorption-edge wavelength slightly shorter than that of the substance to be inspected. For example, to inspect a copper foil, a foil of zinc or the like may be used as the filter.

The X-ray source may employ silver, molybdenum, or the like as the target. By operating the radiation source at an accelerating voltage of about 20 kV and a current of about 1 mA, continuous X-rays can be emitted therefrom without generating characteristic X-rays. The radiation from the target is filtered to allow only rays having the required wavelengths to pass through the filter. Thus, X-rays suitable for the inspection of, for example, copper foils having thicknesses of about 1 to 100 μm can be obtained.

Since X-rays having sufficiently high contrast, i.e., X-rays which undergo a considerable change in intensity when the thickness of a substance being inspected changes, can be used, highly precise foil thickness measurement can be performed.

As the detector which measures the intensity of transmitted X-rays, a Geiger counter, proportional counter, or scintillation counter may be used. Since these detectors have a statistical fluctuation of $N^{\frac{1}{2}}$, where N is the count number, according to the characteristic properties of the detectors, a sufficiently large count number N must be obtained to attain the desired gauging precision. A count is a summation of ionized particles, detected by, for example, a counting tube, which passes pulses to a counting circuit.

In the X-ray detector, the amount of incident X-rays is proportional to the count number. However, if the incident X-rays have too great an intensity, the X-ray detector is saturated, resulting in an inaccurate count number. Therefore, to obtain a large count number using a region which does not cause saturation of the X-ray detector, the measurement must be made over a long time period. When a Geiger counter having a proportional region of from 500 to 1,000 cps is used as the X-ray detector, the incident X-rays may have an intensity up to 1,000 cps. In using a scintillation counter having a proportional region of 10,000 cps, the incident X-rays may have an intensity about ten times that of the X-rays for the Geiger counter.

In producing an electrolytic foil, in which the thickness of the foil is determined by foil production speed and electrolytic current, the uniformity of the width-direction thickness of the foil being produced must be maintained. In producing copper foils used in printed-circuit substrates, the uniformity of the width-direction thickness should be regulated within a precision range of about $\pm 1$ $\mu$m when the standard thickness of the foils is 35 $\mu$m. To attain such a precision, it is necessary to determine how the thickness changes over time, rather than determining a thickness change at a certain point of time, because the uniformity of the width-direction thickness does not change abruptly, but instead gradually changes as the cathodic roller or the counter electrode erodes or changes with time.

The measurement of the intensity of transmitted X-ray or Y-ray is made such that count numbers for gauging points having the same width-direction distance from a side edge of the foil are integrated along the direction of the foil length. This enables thickness fluctuations to be measured with sufficient precision. Hence, in continuous gauging in which an X-ray or $\gamma$-ray source and a detector are continuously moving in the foil width direction, the measurement precision for each portion being gauged can be sufficiently heightened by reducing the movement speed sufficiently. Additionally, large count numbers can be obtained by integrating count numbers obtained by the inspection of a region having a certain length, without separately using such count numbers for respective gauging points. As is known, the integration process is performed under conditions of change over time or change over distance.

If the integration length, i.e., the length of a region of the foil for which the count numbers are integrated, is too long, precisely determining the thickness distribution is difficult. On the other hand, if the integration length is too short, the number of channels in the signal-processing device for processing detection signals should be increased. Sufficient precision can be obtained when the integration length is about from 3 to 5 cm.

A signal indicating the width-direction position of a portion of the foil being gauged may be generated based on a signal output from a position-determining device provided in the movement mechanism which moves the X-ray source and the detector. Alternatively, the time period elapsed since a scan by the measuring device began from a side edge of the foil may be converted to a position-indicating signal, in which case the scanning speed is kept constant. The latter method in which a lapse of time from the scan initiation at a side edge of the foil is converted to a position signal is not as precise as the former method in which the gauging position is directly determined, because determination of the gauging position by the latter method depends on scanning speed. However, the latter method utilizes a much simpler device than that of the former method.

It is noted that when continuous thickness measurement is made using X-rays over a prolonged time period, the intensity of the X-rays with which a foil is being irradiated may fluctuate and this may affect gauging precision. Therefore, correction of detection signals or count numbers may be conducted, as required, by providing the thickness-measurement device with a detector for correction or by disposing a standard sample of a known thickness adjacent a side edge of the foil to be inspected. The device's scanning speed may range from about 50 cm/min to 1 m/min.

By incorporating the continuous, foil thickness measurement device of the present invention into a foil production device, the measurement device comprising an X-ray or $\gamma$-ray source placed on a side of a foil, an X-ray or $\gamma$-ray detector placed on the opposite side of the foil from the radiation source, a movement member which moves the radiation source and the detector synchronously in a direction of the foil width, a signal generator which generates a signal indicating the distance between the position of a foil portion whose thickness is being gauged and a side edge of the foil or which generates a signal indicating the time period that has passed since movement of the radiation source and the detector began from a side edge of the foil, a counter which has integrating channels and which integrates detection signals output from the detector, a signal-switching mechanism which switches the integrating channels of the counter according to signals generated by the signal generator, a calculator which calculates the foil thickness from an integrated count number for each channel of the counter, and an output unit which outputs a foil thickness distribution, the width-direction thickness distribution of the foil being produced can be determined precisely.

Referring to the accompanying drawings, the present invention is in more detail hereinbelow.

FIG. 1 is a view illustrating one embodiment of the continuous, foil thickness measurement device of the present invention. The continuous, foil thickness measurement device 1 includes a U-shaped arm 2 having fixed thereto an X-ray source 3 and a detector 4 such as a scintillation counter or the like. The X-ray source and the detector oppose each other and are placed under and over a foil 5, respectively. The X-ray source is energized by a high voltage from a high-voltage power source 6 for X-ray generation. The X-ray source has an X-ray tube and a filter 7 fitted at an X-ray-emitting opening of the X-ray tube which allows X-rays having specific wavelengths to pass therethrough. Further, the X-ray source is provided with an X-ray shield (not shown) consisting of lead or other materials, to prevent leakage of X-rays to the outside other than to the foil part being inspected.

Although in the device of FIG. 1, the X-ray source is fixed to the lower part of the arm and the detector is fixed to the upper part of the arm, these positions of X-ray source and the detector are interchangeable with each other. When the X-ray source is fixed to the lower part of the arm, the X-ray source can be integrally formed or coupled with the high-voltage power source for X-ray generation, and thus a long high-voltage cable for coupling is not required.

The arm has been provided, at its lower part, with a movement or conveyance mechanism 8, which moves the arm at a predetermined speed by a rack-and-pinion gear mechanism, a wheel-and-rail mechanism, or another like mechanism. The conveyance member may be driven by a motor, oil pressure, air pressure, etc.

To correct fluctuations in the intensity of emitted X-rays, a standard sample 9 having minimal surface roughness is positioned on a table beside the foil. Most desirable standard sample is to use the same material as one to be measured, i.e., when a copper foil thickness is measured, copper standard with known thickness is desirable.

Signals output from the detector are analyzed by a pulse height analyzer 10. The thus-obtained signals are integrated (e.g., under conditions of a change over time) by a counter 13, while channels 14 of the counter are switched by a signal generator which generates a signal indicating the width-direction distance of a gauging part, e.g., a portion of the foil being measured, from a side edge of the foil or a signal indicating the time period that has passed since movement of the X-ray source and the detector began from a side edge of the foil and also by a signal-switching mechanism 12 which is operated by signals output by the signal generator.

When one scan in the foil width direction from one side edge to another is completed, the X-ray source and detector are moved in the opposite direction and thickness measurement is performed similarly. Several methods can be selected: (1) Pre-set the scanning range, (2) Special sensor is attached, and (3) Measured X-ray γ-ray intensity change at the edge of the foil is used. Signals analyzed by the pulse height analyzer are integrated by an integration number controller 15 in respective channels. Each channel is for respective foil portions being measured, the foil portions having an equal width-direction distance from a side edge of the foil, while the signal-switching mechanism is operated by signals indicating distances from a side edge of the foil or indicating time lapses, similarly to the preceding scan in the opposite direction. Thus, signals obtained by a predetermined number of scans are classified into groups by distance from a side edge of the foil, and the classified signals of each group are integrated in a corresponding channel. A thickness distribution is calculated from the integrated data by a thickness calculator 16, and the thickness distribution obtained is output and simultaneously recorded in a length-direction thickness recorder 17.

X-ray or γ-ray data (intensity) obtained are easily converted to foil thickness by comparing them with the standard calibration.

Also, theoretical calculation can be done when the effective wavelength is known.

$$I/I_0 = exp - \mu t$$

where
- $I_0$: Intensity without foil
- $I$: Intensity measured
- $\mu$: Absorption coefficient
- $t$: Thickness of foil In the device of FIG. 1, the relative positions of the X-ray source and the detector are unchanged throughout the measurement since the X-ray source and the detector have been integrally coupled to the U-shaped arm. However, the U-shaped arm must have a length not less than the width of the foil to be inspected. Further, in a foil production device employing the above-described measurement device of the present invention, a space beside the device should be left which corresponds to the length of the U-shaped arm. Hence, if the foil production device is to contain a plurality of electrolytic tanks for foil production, adjacent electrolytic tanks should be spaced apart by a distance not shorter than the length of the U-shaped arm. However, the increased space between electrolytic tanks requires longer bus bars for electrical connection between the electrolytic tanks, and also results in a reduced number of production lines that can be constructed within a predetermined area.

Therefore, when a plurality of electrolytic foil production lines are to be constructed, in lieu of the U-shaped arm, fixed-type supports, such as rails, are preferably positioned over and under the foil and the X-ray source and the detector are moved synchronously on the supports.

Figure 2:
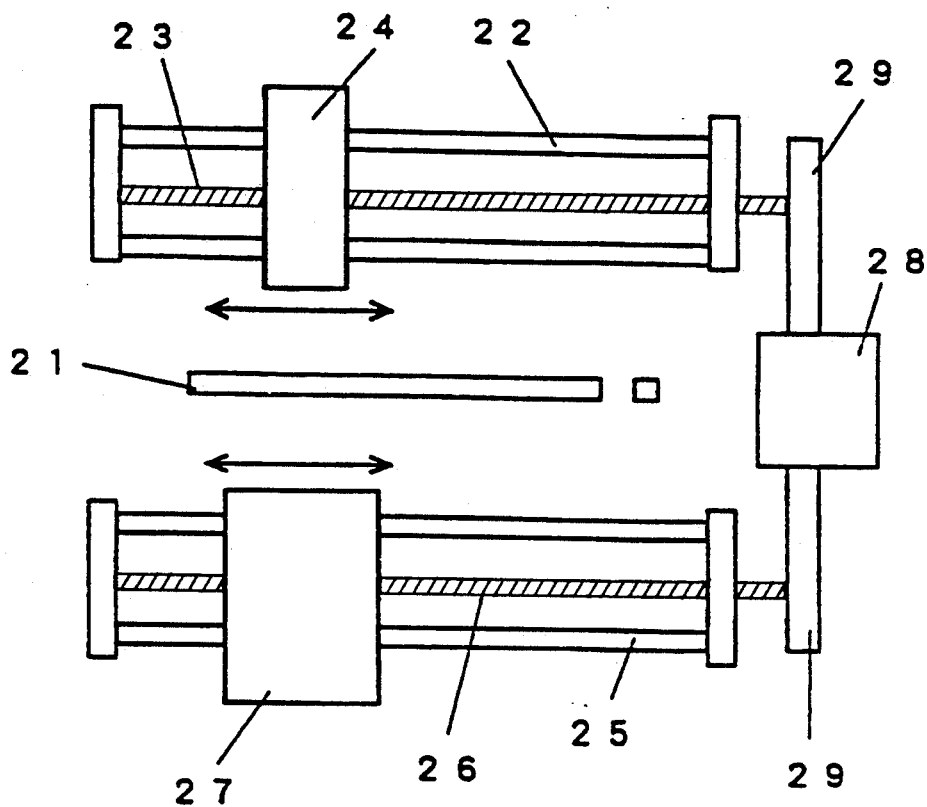
FIG. 2 is a view illustrating the movement mechanism in a second embodiment of the measurement device of the present invention in which an X-ray source and a detector are moved on fixed supports by separate drive shafts.

One example of such a conveyance mechanism by which the X-ray source and detector are moved on fixed supports is shown in FIG. 2, in which an upper support 22 is disposed over a foil 21. Upper support 22 includes a threaded upper drive shaft 23. A detector 24 is supported on the upper support 22, and has a gear which meshes with the screw thread formed on the upper drive shaft 23. By rotating the drive shaft, the detector 24 is transported on the support.

On the other hand, a lower support 25 is disposed under the foil 21, and includes a threaded lower drive shaft 26 similar to the drive shaft for the upper support 22. An X-ray source 27 is supported on the lower support 25, and travels on the lower support by a gear formed thereon which gears with the screw thread on the lower drive shaft 26. The upper and lower drive shafts are rotated by a motor 28 through transmission devices 29, e.g., gear transmissions, to transport the X-ray source and the detector synchronously.

Besides being transported by rotating shafts having a screw thread such as a worm gear as described above, the X-ray source and the detector may be transported by a belt, wire, chain, cylinder utilizing fluid pressure, electromagnetic force, etc., or the X-ray source and detector each may be provided with a dedicated motor to be independently movable. Further, a shift of the relative positions of the X-ray source and detector may be detected to control the driving member based on the detection signals.

Furthermore, to cope with a shift of the relative positions of the X-ray source and detector, the detector may be designed to have a slit width larger than that of the X-ray source.

Figure 3:
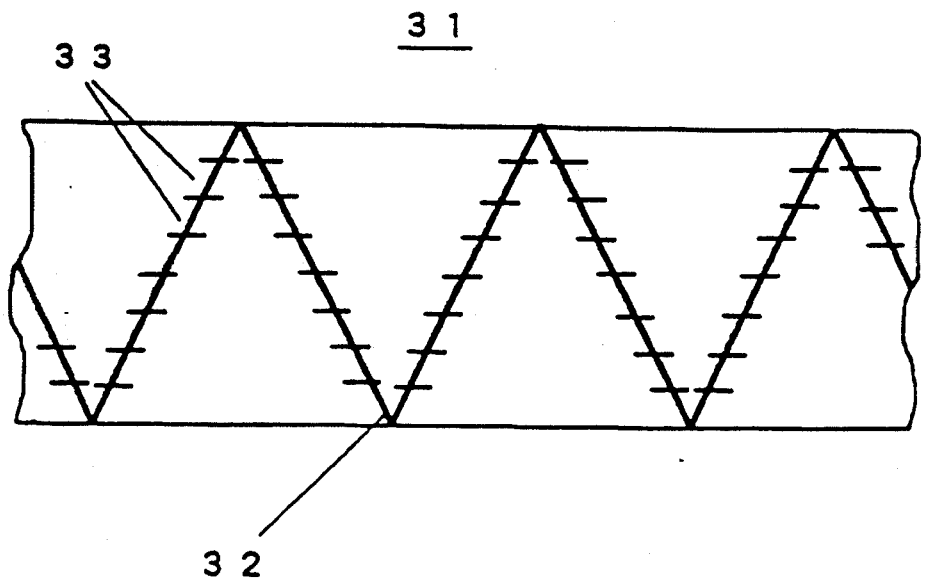
FIG. 3 is a view showing gauging portions and integration regions in a foil.

FIG. 3 shows a line along which thickness gauging was made on a foil. Depending on the scanning speed of the thickness-measurement device and the conveyance speed of the foil, the gauging part shifts on the foil 31 at an angle along a gauging line 32. Signals output from an X-ray detector are integrated for each integration region 33. In the subsequent scan in the opposite direction, the count signal for an integration region is added to the integrated signals for integration regions having the same width-direction distance from a side edge of the foil as that of the integration region. By conducting such addition for a predetermined number of times, the count number for each integration region consisting of gauging parts having the same distance from a side edge of the foil can be increased.

Since a thickness distribution does not change abruptly in electrolytic copper foils, precise measurement can be made by thus adding the count numbers for a plurality of gauging parts, e.g., foil portions to be measured in each of the integration regions. The proper range of the addition number for each integration region is generally from 5 to 10 to keep the measurement precision, but the addition number may be suitably fixed according to the scanning speed of the thickness-measurement device and the conveyance speed of the foil to be inspected.

Figure 4A:
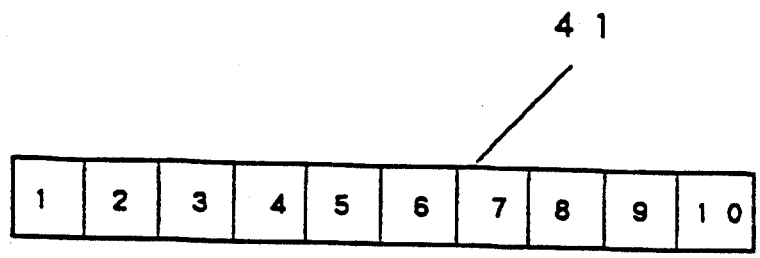
FIG. 4 is a view illustrating a process in which data are integrated in a memory.
Figure 4B:
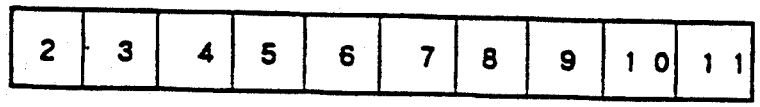
Figure 5:
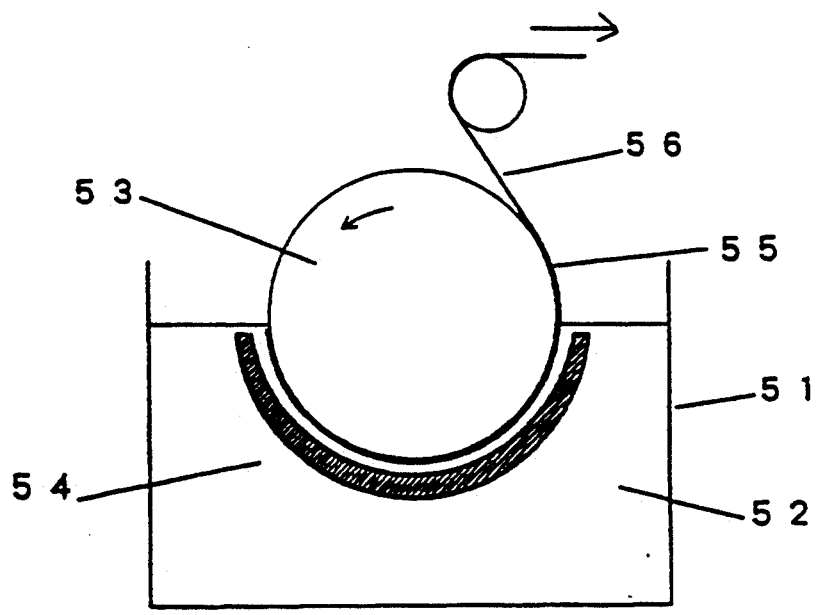
FIG. 5 is a view illustrating a device for electrolytically producing a copper foil.

FIGS. 4 (A) and 4 (B) illustrate how the memory in one of the channels of a count signal processor is used. FIG. 4 (A) illustrates the memory state when the integration number e.g. a memory cell number is fixed at 10 by an integration number controller, in which case, count signals for one integration region which were obtained through ten scanning operations, from the first to the tenth scans, have been memorized by the memory 41. Upon subsequent addition of a count signal for the integration region in which the signal was obtained through the eleventh scan, the signal obtained by the first scan is eliminated and replaced as shown in FIG. 4 (B). Thus, a count signal obtained by adding a constant number of count signals for one integration region is always recorded in the memory. The signal thus obtained for one integration region by adding a constant number of count signals is treated by a thickness calculator to determine the thickness distribution in the width direction. The determined thickness distribution is outputted. Simultaneously, such thickness distribution data are stored in a length-direction thickness distribution recorder at predetermined time intervals, which makes it possible to determine how the foil thickness changes over a prolonged time period.

The present invention will be explained below by means of Examples, but the invention is not to be construed as being limited thereto.

EXAMPLE 1

Thickness measurement of a 35 $\mu$m-thick, 1.2 m-wide electrolytic copper foil continuously produced by an electrolytic copper foil-producing device at a speed of 4 cm/sec was made as follows to determine the thickness distribution of the foil.

As a radiation source for a thickness-measurement device, an X-ray tube was used which contained silver as the anode. At an applied voltage of 25 kV and a current of 1 mA, this radiation source generated X-rays which contained no characteristic X-rays of silver and consisted of continuous X-rays only. The X-ray source was provided with a 30 $\mu$m-thick titanium foil as a longer-wavelength filter and with a 50 $\mu$m-thick zinc foil as a shorter-wavelength filter, whereby the radiation source emits X-rays having wavelengths of from 0.13 to 0.15 nm. Thereafter, a collimator was attached to the resulting X-ray source placed under the foil at a distance of 10 cm therefrom so that the X-ray beam striking the foil had a diameter of 10 mm at the surface of the area of the foil to be measured. On the upper side of the foil, a scintillation detector having a diameter of 20 mm was placed 10 cm away from the foil.

The X-ray source and the detector had been fixed to a U-shaped arm having a length of 1.2 m so that they were able to move in the width direction of the foil. Beside a side edge of the foil was disposed a standard sample-supporting table, on which a 35 $\mu$m-thick copper foil having no surface roughness was placed as a standard sample for the correction of X-ray intensity.

Scanning in the foil width direction was conducted at a speed of 50 cm/min by moving the X-ray source and the detector by a motor and a rack-and-pinion mechanism which converted the rotary motion by the motor to a linear motion. During the scanning from a side edge of the foil, a time signal was generated by a signal generator at intervals of 6 seconds which corresponded to each of 5-cm portions of the foil to be measured, and was fed to a signal-switching mechanism. A counter integrated signals sent from a pulse height analyzer, while channels of the counter were being switched by the signal-switching member. This scan was repeated ten times. In each of the scans, signals obtained by thickness gauging were analyzed by the pulse height analyzer and then integrated by the counter, while the channels of the counter were being switched by the signal-switching member which was operated by signals generated by the signal generator and indicating time lapses from the scan start from the foil side edge.

When one scan in the foil-width direction from one side edge to the other is completed, the X-ray source and detector are then moved in the opposite direction and another thickness measurement is made likewise. Signals analyzed by the pulse height analyzer are integrated, by an integration number controller, in respective channels each of which is for gauging foil portions having an equal width-direction distance from a side edge of the foil, while the signal-switching mechanism is operated by signals indicating distances from a side edge of the foil or indicating time lapses, similarly to the preceding scan in the opposite direction. Thus, signals obtained through a predetermined number of scans are classified into groups by distance from a side edge of the foil, and the classified signals of each group are integrated in a corresponding channel. A thickness distribution is calculated from the integrated data by a thickness calculator, and the thickness distribution obtained is output.

In the thickness-measurement device used above, the X-ray source and the detector were fixed to a U-shaped arm and, hence, could travel in the width direction of the foil. Further, a standard sample for the correction of X-ray intensity was disposed beside a side edge of the foil, and foil thickness data obtained were corrected based on signals obtained from the standard sample.

The scanning of the foil in the width direction was conducted at 50 cm/min, and signals obtained in every 6 seconds, which corresponded to a 5-cm gauging portion, after the scanning start from a side edge of the foil were integrated. The integration was completed by an integration number controller whenever successive 10 scans were completed. According to this method, since the X-ray counting rate of the detector was 20,000 cps, the count number for a 5-cm gauging part was $20,000 \times (5/50) \times 60 = 120,000$ cps and 10 scans resulted in a count of 1,200,000. On the other hand, the statistical error $\sigma$ of the detector was an 1,100 count, or 0.1% in terms of the count number percent. Therefore, the precision of the above gauging was 0.4% in terms of absolute value and ±0.5 μm in terms of thickness value, provided that the actual error was ±2$\sigma$.

As described and demonstrated above, according to foil production employing the continuous, foil thickness measurement device of the present invention, which comprises an X-ray or γ-ray source placed on one side of a foil, an X-ray or γ-ray detector placed on the opposite side of the foil from the radiation source, a movement member which moves the radiation source and the detector synchronously in the foil width direction, a signal generator which generates a signal indicating the distance between the position of a portion of the foil whose thickness is being gauged and a side edge of the foil or which generates a signal indicating the time period that has passed since a movement of the radiation source and the detector began from a side edge of the foil, a counter which has integrating channels and integrates detection signals sent from the detector, a signal-switching mechanism which switches the integrating channels of the counter according to signals generated by the signal generator, a calculator which calculates the foil thickness from an integrated count number for each channel, and an output unit which outputs a foil thickness distribution, high-precision thickness gauging may be performed because a large quantity of count numbers for a predetermined region in the width direction can be obtained by integration of detection signals.

While the invention has been described in detail and with reference to specific embodiments thereof, it will be apparent to one skilled in the art that various changes and modifications can be made therein without departing from the spirit and scope thereof.

What is claimed is:

1. A continuous, foil thickness measurement device adapted for use with a foil and adapted for incorporation into a foil production device, comprising:
   an X-ray or γ-ray radiation source, positioned on a first side of a foil, for transmitting radiation toward said foil;
   an X-ray or γ-ray detector, positioned on a second side of said foil from the radiation source, said first side being opposed to said second side, said detector including means for measuring the intensity of the transmitted radiation after a portion of incident radiation has been absorbed by the foil;
   a movement member for moving the radiation source and the detector synchronously in a width direction of the foil;
   a signal generator which generates one of a signal indicating a distance between a position of a portion of said foil whose thickness is being gauged and a side edge of the foil and a signal indicating the time period elapsed since movement of the radiation source and the detector began from a side edge of the foil;
   a counter having a plurality of channels and which integrates, as a function of either change over said elapsed time or said distance between a portion of said foil whose thickness is being gauged and a side edge of said foil, detection signals output from the detector to generate an integrated count number for each channel;
   a channel-switching member for switching each of the plurality of channels of the counter according to signals generated by the signal generator, said channels being switched so as to store respective signals generated by said signal generator in said channels;
   a calculator which calculates a foil thickness from said integrated count number for each channel of said counter; and
   an output unit which outputs a foil thickness distribution.

2. A device as claimed in claim 1, wherein said movement member comprises fixed supports disposed over and under the foil and a driving member which moves the radiation source and the detector synchronously on the fixed supports.

3. A device according to claim 2, wherein said signals obtained by a predetermined number of scans are classified into groups by distance from a side edge of said foil, and said classified signals of each group are integrated in a corresponding channel.

4. A device as claimed in claim 1, wherein said counter includes an integration number controller which classifies detection signals obtained during a plurality of movements of the radiation source and the detector into groups by distance from a side edge of the foil and integrates classified detection signals of each group.

5. A device as claimed in claim 1, wherein said foil comprises an electrolytic metal foil.

6. A device as claimed in claim 1, wherein said X-ray or γ-ray source comprises an X-ray generator having a first filter for filtering rays having wavelengths of a first predetermined length and a second filter for filtering rays having wavelengths of a second predetermined length.

7. A device according to claim 6, wherein said second filter comprises a metal having an atomic number smaller than the substance of which said foil is formed.

8. A device according to claim 7, wherein said foil comprises copper, and said second filter comprises titanium.

9. A device according to claim 6, wherein said first filter comprises a material having an absorption-edge wavelength shorter than that of said foil.

10. A device according to claim 9, wherein said foil comprises copper, and said first filter comprises zinc.

11. A device as claimed in claim 1, further comprising a sample adapted for use in correcting thickness signals and which corrects an intensity of X-rays during thickness measurement, said sample being disposed adjacent said foil.

12. A device according to claim 1, wherein said detector has a statistical fluctuation of $N^{\frac{1}{2}}$, where N is the count number, and wherein the amount of incident X-rays on said foil is proportional to said count number, said count numbers gauging respective points having a same distance in a width-direction from a side edge of said foil, and said measurement of intensity of transmitted rays being based on said count numbers integrated along a direction of the length of the foil.

13. A device according to claim 1, wherein a length of a region of said foil for which said count numbers are integrated is in a range of approximately from 3 to 5 cm.

14. A device according to claim 1, further comprising a correction mechanism for correcting at least one of said detection signals and said count numbers.

15. A device as claimed in claim 1, wherein said movement member comprises a driving member which includes a support having coupled thereto the radiation source and the detector, said driving member moving the support coupled with the radiation source and the detector.

16. A device according to claim 1, wherein said thickness distribution output by said output unit is simultaneously recorded in a length-direction thickness recorder.

17. A device according to claim 1, wherein said movement member includes a U-shaped arm having a length not less than the width of the foil to be inspected.

18. A device for continuously measuring a thickness of a foil, comprising:
- a radiation source, positioned on a first side of said foil, for transmitting radiation toward said foil;
- a radiation detector, positioned on a second side of said foil, said second side being opposite said first side of said foil, said detector including means for measuring the intensity of the transmitted radiation after a portion of incident radiation has been absorbed by the foil;
- a conveyance member which conveys said radiation source and the detector synchronously in a width direction of said foil;
- a signal generator which generates a signal indicating a position, in the width-direction of said foil, of a portion of said foil being measured;
- a counter having a plurality of channels which integrates detection signals sent from said detector to generate an integrated count number for each channel;
- a channel-switching member which switches the channels of said counter according to signals generated by said signal generator, said channels being switched so as to store respective signals generated by said signal generator in said channels;
- a calculator which calculates the foil thickness from said integrated count number for each channel; and
- an output unit which outputs a foil thickness distribution.

19. A device according to claim 18, further comprising a position-determining device, wherein said signal indicating said width-direction position of said portion of said foil whose thickness is being measured is based on a signal output from said position-determining device provided in said movement mechanism which moves said radiation source and said detector.

20. A device according to claim 18, wherein said signal indicating the width-direction position of said foil of said portion of said foil being measured is generated based on a time period which has elapsed since a scan by said device began from a side edge of sad foil, said time period being converted to a radiation-indicating signal, and wherein said scanning speed is constant.

* * * * *